United States Patent
Seppä et al.

(10) Patent No.: US 12,256,152 B2
(45) Date of Patent: Mar. 18, 2025

(54) SYSTEM FOR PROVIDING STEALTHY VISION

(71) Applicant: TEKNOLOGIAN TUTKIMUSKESKUS VTT OY, Espoo (FI)

(72) Inventors: Santeri Jeremias Seppä, VTT (FI); Teemu Kääriäinen, VTT (FI); Thomas Fordell, VTT (FI)

(73) Assignee: TEKNOLOGIAN TUTKIMUSKESKUS VTT OY, Espoo (FI)

( * ) Notice: Subject to any disclaimer, the term of this patent is extended or adjusted under 35 U.S.C. 154(b) by 219 days.

(21) Appl. No.: 17/594,506

(22) PCT Filed: Apr. 22, 2020

(86) PCT No.: PCT/FI2020/050262
§ 371 (c)(1),
(2) Date: Oct. 20, 2021

(87) PCT Pub. No.: WO2020/216990
PCT Pub. Date: Oct. 29, 2020

(65) Prior Publication Data
US 2022/0201188 A1    Jun. 23, 2022

(30) Foreign Application Priority Data
Apr. 23, 2019   (FI) .................................... 20195323

(51) Int. Cl.
*H04N 23/74*   (2023.01)
*F41G 1/35*    (2006.01)
(Continued)

(52) U.S. Cl.
CPC ............. *H04N 23/74* (2023.01); *G02B 23/12* (2013.01); *F41G 1/35* (2013.01); *F41G 1/36* (2013.01); *G03B 15/02* (2013.01)

(58) Field of Classification Search
None
See application file for complete search history.

(56) References Cited

U.S. PATENT DOCUMENTS 4,947,044 A    8/1990   Pinson
5,028,129 A    7/1991   Smith
(Continued)

FOREIGN PATENT DOCUMENTS

CN    103915754 A    7/2014
CN    105591271 A    5/2016
(Continued)

OTHER PUBLICATIONS

Seach Report issued by the Finnish Patent and Registration Office in relation to Finnish Application No. 20195323 dated Jul. 12, 2019 (1 page).
(Continued)

*Primary Examiner* — Stefan Gadomski
(74) *Attorney, Agent, or Firm* — Robert P. Michal, Esq.; Carter, DeLuca & Farrell LLP

(57) ABSTRACT

A system for providing stealthy vision, includes a source element providing electromagnetic radiation at a predetermined wavelength to illuminate a target; and a camera imaging the target to be illuminated; wherein the source element provides electromagnetic radiation including shortwave infrared light; and wherein the predetermined wavelength includes a wavelength in the near infrared spectrum wherein the absorption features of an atom or a molecule present in the medium where the electromagnetic radiation propagates form a continuum, that is a wavelength region
(Continued)

wherein two or more narrow absorption lines are close enough to each other that they effectively form a single absorption area with a width greater than that of a single absorption line so that the range of the electromagnetic radiation in the medium is limited for all wavelengths within the continuum; wherein the region corresponds to a wavelength range centered at about 1382.8 nm, 1388.1 nm or 1392.4 nm.

15 Claims, 2 Drawing Sheets

(51) Int. Cl.
  *F41G 1/36* (2006.01)
  *G02B 23/12* (2006.01)
  *G03B 15/02* (2021.01)

(56) References Cited

U.S. PATENT DOCUMENTS

| | | | | |
|---|---|---|---|---|
| 8,336,777 | B1* | 12/2012 | Pantuso | F41G 3/16 235/404 |
| 8,800,870 | B1* | 8/2014 | Burkland | G01C 3/08 235/404 |
| 10,348,051 | B1* | 7/2019 | Shah | G01S 17/34 |
| 2010/0148093 | A1 | 6/2010 | Benton | |
| 2012/0062697 | A1* | 3/2012 | Treado | G01S 3/7864 348/E13.001 |
| 2012/0062740 | A1* | 3/2012 | Treado | G01J 3/0289 348/E7.085 |
| 2012/0145906 | A1* | 6/2012 | Treado | G01N 21/31 250/341.1 |
| 2012/0154792 | A1* | 6/2012 | Treado | G01J 3/0264 356/51 |
| 2012/0274775 | A1* | 11/2012 | Reiffel | G06Q 30/08 348/158 |
| 2013/0112879 | A1* | 5/2013 | Meyers | G02B 23/12 250/341.8 |
| 2014/0300897 | A1* | 10/2014 | Treado | G01J 3/2823 356/416 |
| 2015/0247703 | A1* | 9/2015 | Teetzel | G01S 17/08 356/5.01 |
| 2015/0263806 | A1* | 9/2015 | Puscasu | F41H 13/00 398/130 |
| 2016/0084708 | A1* | 3/2016 | Vallejo Veiga | G01J 3/2823 356/51 |
| 2016/0105609 | A1* | 4/2016 | Pettegrew | G06T 3/4038 348/37 |
| 2016/0178444 | A1* | 6/2016 | Oulachgar | G01J 3/36 250/349 |
| 2016/0187654 | A1* | 6/2016 | Border | G02B 27/0172 359/630 |
| 2017/0155225 | A1* | 6/2017 | Villeneuve | H01S 3/06754 |
| 2017/0219693 | A1* | 8/2017 | Choiniere | G01S 7/4808 |
| 2018/0128906 | A1* | 5/2018 | Choiniere | G01S 7/4816 |
| 2018/0322620 | A1* | 11/2018 | Roux | G06T 5/50 |
| 2019/0219834 | A1* | 7/2019 | Ace | G02B 5/223 |
| 2021/0210926 | A1* | 7/2021 | Yang | H04B 10/50575 |

FOREIGN PATENT DOCUMENTS

| | | |
|---|---|---|
| FI | 20176019 A1 | 5/2019 |
| JP | 2017198536 A | 11/2017 |
| WO | 2008139187 A2 | 11/2008 |

OTHER PUBLICATIONS

International Search Report issued by European Patent Office acting as the International Searching Authority in relation to International Application No. PCT/FI2020/050262 dated Jul. 15, 2020 (3 pages).
Written Opinion of the International Searching Authority issued by European Patent Office acting as the International Searching Authority in relation to International Application No. PCT/FI2020/050262 dated Jul. 15, 2020 (7 pages).

* cited by examiner

SYSTEM FOR PROVIDING STEALTHY VISION

CROSS-REFERENCE TO RELATED APPLICATIONS

This application is a national phase entry under 35 U.S.C. 371 of PCT International Application No. PCT/FI2020/050262 filed Apr. 22, 2020, which claims priority to Finnish Patent Application No. 20195323, filed Apr. 23, 2019, the disclosure of each of these applications is expressly incorporated herein by reference in their entirety.

TECHNICAL FIELD

The present application generally relates to illumination and visibility. In particular, but not exclusively, the present application relates to a system for providing stealthy vision. In particular, but not exclusively, the present application relates to a system for providing stealthy vision using absorption.

BACKGROUND

This section illustrates useful background information without admission of any technique described herein being representative of the state of the art.

Lighting is constantly required and present in almost any aspect of modern life. Accordingly, an increasing amount of "light pollution" is also present in urban environments. There has been discussion aiming at reducing such unnecessary light, for example by limited light usage or spectrum.

Visibility is often required in situations in which it would be desirable that the light used is not visible to others. Such situations include for example nature observation or military operations. Furthermore, equipment for visibility in dark conditions is used and developed, for example night vision equipment and thermal imaging equipment.

Previously, limited range illumination has been provide using a tunable light source and absorption information. Such a system is known from unpublished patent application FI20176019 filed by the same applicant. Such a system requires relatively delicate wavelength control of the narrowband source to exploit narrow, isolated lines in the absorption spectrum of the medium.

Accordingly, there is need for simplified illumination and visibility with a limited range. It is the aim of the invention to provide a system for providing stealthy vision improving the previous solutions.

SUMMARY

Various aspects of examples of the invention are set out in the claims.

According to a first example aspect of the present invention, there is provided a system for providing stealthy vision, comprising
 a source element configured to provide electromagnetic radiation at a predetermined wavelength in order to illuminate a target; and
 a camera configured to image the target to be illuminated at the predetermined wavelength; wherein
 the source element is configured to provide electromagnetic radiation comprising shortwave infrared light; and wherein
 the predetermined wavelength comprises a wavelength in a region of the near infrared spectrum wherein the absorption features of an atom or a molecule present in the medium through which the electromagnetic radiation propagates form a continuum, that is a wavelength region wherein two or more narrow absorption lines are close enough to each other that they effectively form a single absorption area with a width greater than that of a single absorption line so that the range of the electromagnetic radiation in the medium is limited for all wavelengths within the continuum; wherein
 the region corresponds to a wavelength range centered at about 1382.8 nm, 1388.1 nm or 1392.4 nm.

The wavelength region may have a width of more than 0.2 nm.

The wavelength region may have a width of more than 0.5 nm.

The source element may comprise a laser source configured to provide the predetermined wavelength.

The source element may comprise a broadband source of electromagnetic radiation.

The source element may comprise a filter element configured to filter the electromagnetic radiation to the predetermined wavelength.

The camera may comprise a short wave infrared, SWIR, camera.

The atom or molecule present in the medium through which the electromagnetic radiation propagates may comprise $H_2O$.

The source element may be adjustable for choosing a predetermined wavelength.

According to a second example aspect of the present invention, there is provided a method for providing stealthy vision, comprising
 illuminating a target with electromagnetic radiation comprising shortwave infrared light at a predetermined wavelength from a source element; and imaging the illuminated target with camera configured to image the target (30) to be illuminated at the predetermined wavelength; wherein
 the predetermined wavelength comprises a wavelength in a region of the near infrared spectrum wherein the absorption features of an atom or a molecule present in the medium through which the electromagnetic radiation propagates form a, that is a wavelength region wherein two or more narrow absorption lines are close enough to each other that they effectively form a single absorption area with a width greater than that of a single absorption line so that the range of the electromagnetic radiation in the medium is limited for all wavelengths within the continuum; and wherein
 the region corresponds to a wavelength range centered at about 1382.8 nm, 1388.1 nm or 1392.4 nm.

The wavelength region may have a width of more than 0.2 nm.

The wavelength region may have a width of more than 0.5 nm.

The method may further comprise adjusting the source element in order to choose a predetermined wavelength from several predetermined wavelengths.

According to a third example aspect of the present invention, there is provided an apparatus, comprising
 a system for providing stealthy vision of the first example aspect of the present invention; and a processor configured to cause the apparatus to carry out the method of the second example aspect of the present invention.

The apparatus may comprise a handheld electronic device.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

The present invention and its potential advantages are understood by referring to FIGS. 1 through 4 of the drawings. In this document, like reference signs denote like parts or steps.

Figure 1:
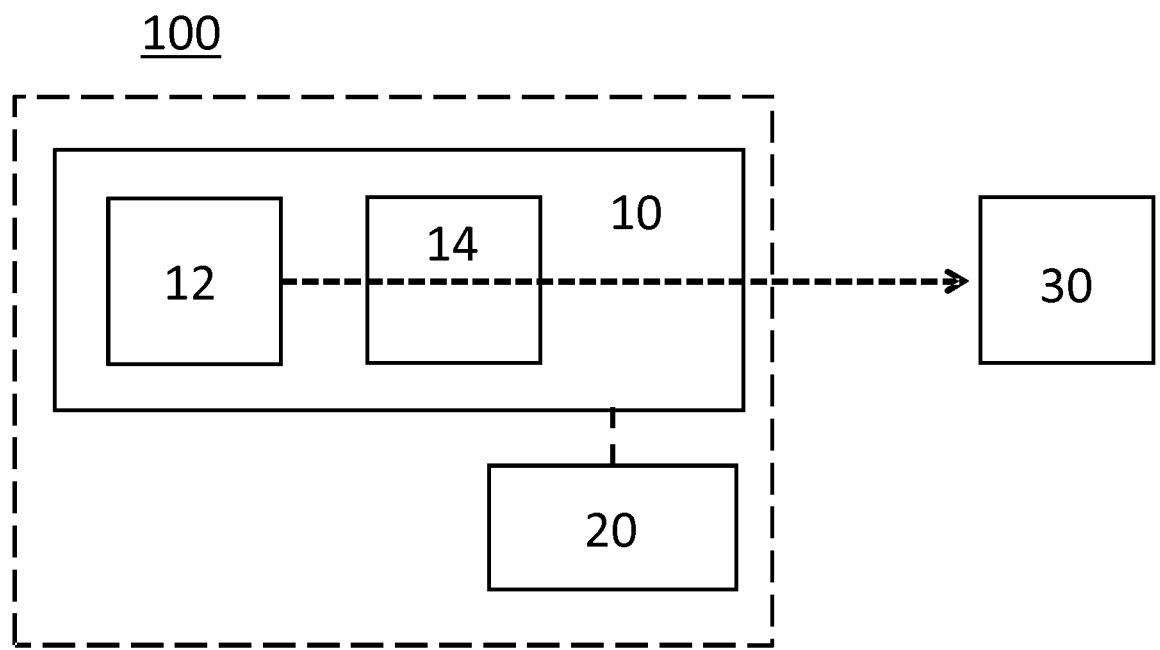
FIG. 1 shows a schematic block view of a system for providing stealthy vision according to an embodiment of the invention.

FIG. 1 shows a schematic block view of a system 100 for providing stealthy vision according to an embodiment of the invention. The system 100 comprises a source element 10 configured to provide electromagnetic radiation at a specific, predetermined wavelength. The linewidth of the source element 10 is in an embodiment about 1 nm. The source element 10 comprises a source 12 of electromagnetic radiation. In an embodiment, the source 12 comprises a laser source. In an embodiment, the laser source comprises a semiconductor laser source. In a further embodiment, the source 12 comprises narrow operating bandwidth laser such as a single-mode laser, distributed feedback laser, external cavity laser, a gas laser, or a solid-state laser with limited operational bandwidth matching the spectral feature(s) exploited, with or without a system controlling the laser operational parameters like temperature or electrical current. In a such a case a separate filter may not be needed. In a further embodiment, the source 12 comprises a broadband source of electromagnetic radiation, such as a light emitting diode or incandescent source. In an embodiment, the source 12 is configured to provide collimated electromagnetic radiation for the purpose of using e.g. interference filters or highly focused light beam.

In an embodiment, the source element 10 further comprises a filter element 14 configured to filter the electromagnetic radiation to a specific, predetermined wavelength range. In an embodiment, the filter element 14 comprises a bandpass filter element configured to filter the electromagnetic radiation from the source 12, for example from a laser source or a broadband source to a specific, predetermined wavelength. In an embodiment, the filter element 14 comprises at least one filter. In a further embodiment, the filter element 14 comprises a plurality of filter elements the combined effect of which is configured to filter the electromagnetic radiation exiting the source element 10 to a specific, predetermined wavelength. In a further embodiment, the filter element 14 comprises a comb filter, or a multi-band bandpass filter matching multiple separate wavelengths or wavelength ranges simultaneously. In a still further embodiment, the filter element comprises a tunable filter.

In an embodiment, the source element 10 is tunable and therethrough configured to choose the predetermined wavelength from several possibilities. In such a case the source 12 and/or the filter element 14 is configured to be tunable, so that the predetermined wavelength can be chosen from several possibilities. In a further embodiment, the source element 10 is temperature and/or pressure stabilized. In a still further embodiment, the temperature and/or pressure of the medium in which the electromagnetic radiation is to propagate or the temperature of the system and/or the source element 10 is measured, and the source element is adjusted accordingly.

The predetermined wavelength provided by the source element 10 comprises in an embodiment a wavelength of the near infrared spectrum. The predetermined wavelength is chosen in such a way that the range, i.e. the distance from the source from which the electromagnetic radiation can be observed, of the electromagnetic radiation in the medium through which it propagates becomes limited due to absorption by an atom or a molecule in the medium. In an embodiment, the predetermined wavelength comprises a wavelength in a region of the near infrared spectrum wherein the absorption features of an atom or a molecule present in the medium through which the electromagnetic radiation propagates form a continuum, that is a wavelength region wherein two or more narrow absorption lines are close enough to each other that they effectively form a single absorption area with a width greater than that of a single absorption line so that the range of the electromagnetic radiation becomes limited for all wavelengths within the continuum. In an embodiment, the width of the region is more than 0.2 nm. In a further embodiment, the width of the region is more than 0.5 nm. With such a selection of the predetermined wavelength the range of the electromagnetic radiation in the medium is limited, and the absorption features of the atom or molecule in the medium enable using a source element, the linewidth of which need not be impractically small, i.e. no complicated arrangements for adjusting the source element are required. In an embodiment the atom or molecule present in the medium through which the electromagnetic radiation propagates comprises $H_2O$.

In an embodiment, the region of the near infrared spectrum corresponds to a wavelength range centered at about 1382.8 nm, 1388.1 nm or 1392.4 nm.

The system 100 further comprises a camera 20 configured to image a target 30 which is illuminated by the electromagnetic radiation from the source element 10. The camera is configured to function at the predetermined wavelength, i.e. the camera is able to image at and around the predetermined wavelength. In an embodiment, the camera 20 comprises a shortwave infrared, SWIR, camera configured to image a target 30 which is illuminated by the electromagnetic radiation from the source element 10. Hereto it is noted that the target 30 is understood to comprise a small specific target 30, such as a certain point illuminated by the electromagnetic radiation or a larger unspecific target 30, for example a certain area of the surroundings of the system 100. In an embodiment, the SWIR-camera 20 comprises an indium gallium Arsenide, InGaAs, imaging sensor. The camera 20 is configured to function at the predetermined wavelength and in an embodiment adjustable to the chosen predetermined wavelength. The ranges of predetermined wavelengths hereinbefore described are not visible to naked eye, but they are visible by imaging with the camera 20. However, the wavelengths would be obviously visible also to other similar cameras, and accordingly, the limited range of the electromagnetic radiation is needed to provide a stealthy vision.

In an embodiment, the camera 20, or the system 100, comprises or is connected to means for viewing the image imaged by the camera 20, such as a display. In a further embodiment, the camera 20 is provided integrated with the source element 10, i.e. built into the same case or enclosure as the source element 10, for example in order to provide an apparatus resembling night vision goggles or a videocamera. In a further embodiment, the camera 20 is connected with the source element 10 but positioned distant therefrom, for example when the system 100 is integrated with a larger entity such as a vehicle or when the source element 10 is integrated with one device and the camera with another device.

In an embodiment the system 100 comprises further elements (not shown in FIG. 1) such as optical elements for guiding the electromagnetic radiation. In an embodiment, the optical elements comprise elements known to skilled person, such as lenses, mirrors and gratings, for guiding and/or focusing the electromagnetic radiation.

Figure 2:
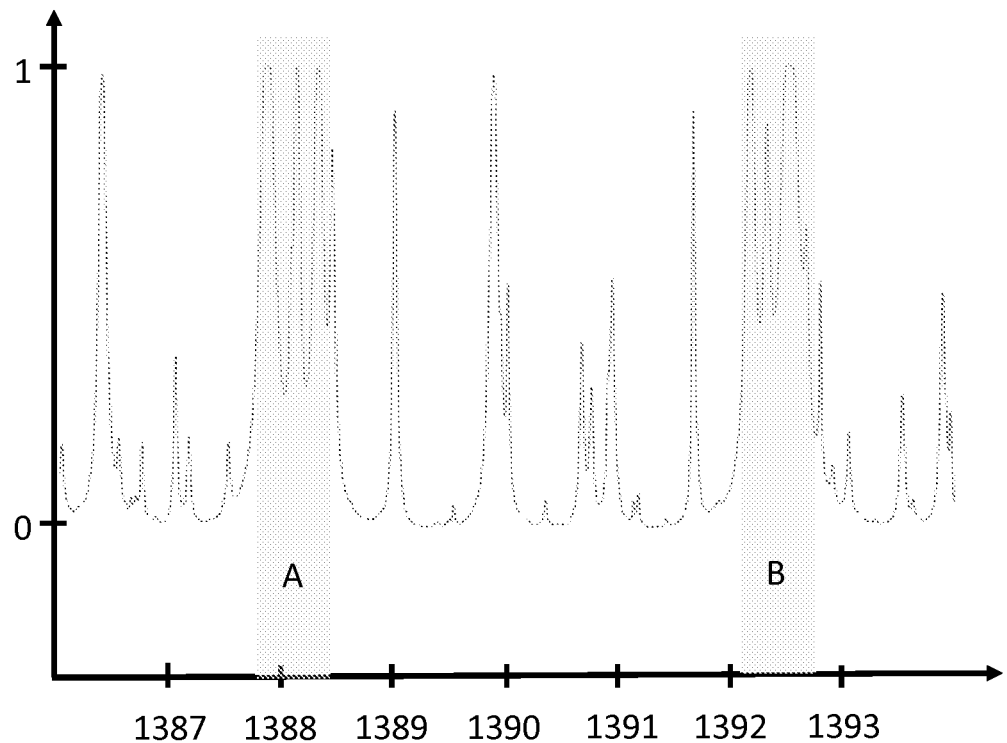
FIG. 2 shows an exemplary graph of transmission of the electromagnetic radiation provided by the system for providing stealthy vision according to an embodiment of the invention.

FIG. 2 shows an exemplary graph of absorption of the electromagnetic radiation provided by the system for providing stealthy vision according to an embodiment of the invention. The horizontal axis of the graph of FIG. 2 shows the wavelength in nanometers and the vertical axis shows the absorption as a coefficient between zero and one. As can be seen from FIG. 2, the predetermined wavelength is chosen to correspond to an example wavelength region shown in FIG. 2 of the near infrared spectrum wherein the absorption features of an atom or a molecule present in the medium through which the electromagnetic radiation propagates form a continuum, that is a wavelength region wherein two or more narrow absorption lines are close enough to each other that they effectively form a single absorption area with a width greater than that of a single absorption line. FIG. 2 shows two regions A,B centered at 1382.8 nm and 1388.1 nm respectively according to an embodiment of the invention.

An example of the limited range of the electromagnetic radiation using the predetermined wavelengths hereinbefore described is as follows. In an embodiment, the predetermined wavelength comprises a wavelength on a region corresponding to a wavelength range centered at about 1382.8 nm, 1388.1 nm or 1392.4 wherein the absorption features of an atom or a molecule present in the medium through which the electromagnetic radiation propagates form a continuum, that is a wavelength region wherein two or more narrow absorption lines are close enough to each other that they effectively form a single absorption area with a width greater than that of a single absorption line. At said wavelength ranges, with an example temperature of 296K and with an example percentage of H2O molecules of 1% in the medium, at a distance of 100 m, approximately less than 2%, depending on the chosen region, of the irradiance, or radiated power is left and accordingly, the range of the source of electromagnetic radiation is limited. The predetermined wavelength is not visible to the naked eye, but is viewed through the camera 20.

Figure 3:
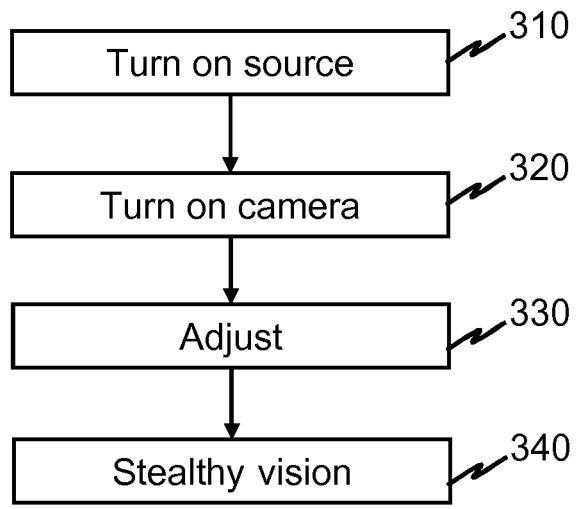
FIG. 3 shows a flow chart of a method for providing stealthy vision according to an embodiment of the invention.

FIG. 3 shows a flow chart of a method for providing stealthy vision according to an embodiment of the invention. At 310 the source element 10 is turned on in order to provide electromagnetic radiation at a predetermined wavelength and to illuminate a target 30. The target 30 may be a point target 30 or a larger area.

At 320 the camera 20 is turned on and the target 30 illuminated with the electromagnetic radiation provided by the source element is imaged with the camera 20 and can be viewed for example on a display. At this point, it can also be ascertained that the predetermined wavelength chosen is suitable for the desired illumination purposes, i.e. the illuminated target 30 can be viewed with the camera 20 thus providing the stealthy vision. In an embodiment, the steps 310 and 320 are carried out concurrently.

At step 330 the predetermined wavelength is adjusted if needed. That is, in some situations it might be desirable to choose a different predetermined wavelength, for example if several systems are in use concurrently or if visibility with one predetermined wavelength as viewed with the camera 20 is not at a desired level. Hereto it is noted, that step 330 can be carried out several times, if needed. Finally, at step 340, the stealthy vision is at use.

Figure 4:
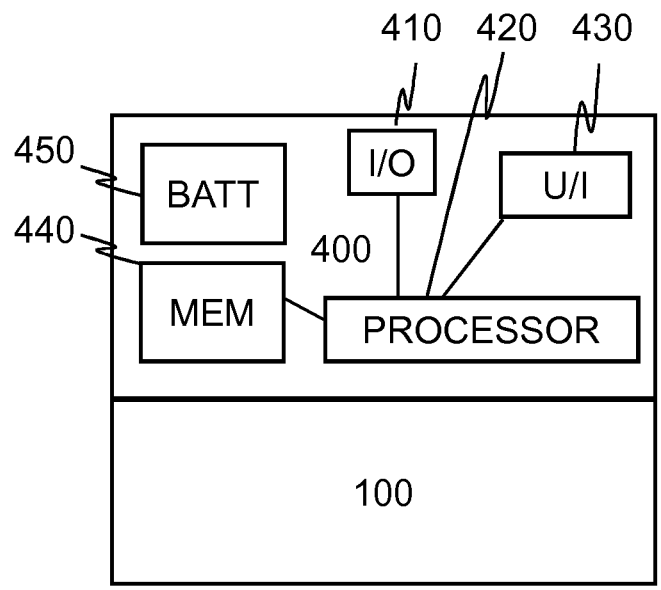
FIG. 4 shows a schematic block view of an apparatus according to an embodiment of the invention.

FIG. 4 shows a schematic block view of an apparatus according to an embodiment of the invention. The apparatus comprises at least one system 100 for providing stealthy illumination according to an embodiment of the invention as hereinbefore described. In an embodiment, the apparatus 400 comprises more than one system 100 for providing stealthy illumination according to an embodiment of the invention. In such a case, each system 100 for providing stealthy illumination is configured to be used with a desired wavelength, same or different from the desired wavelength of further systems 100 for providing stealthy illumination.

The apparatus 400 further comprises electronics configured to control the operations of the apparatus, to carry out calculations and to cause carrying out the steps of the method according to the invention. The apparatus 400, in an embodiment, comprises a memory 440 and a processor 420. The processor 420 is, configured to cause controlling of the operation of the apparatus and the system 100 for providing stealthy illumination using a non-transitory computer program code stored in the memory 440.

In a further embodiment, the apparatus 400 comprises a communication unit 410 comprising, for example, a local area network (LAN) port; a wireless local area network (WLAN) unit; Bluetooth unit; cellular data communication unit; near field communication unit or satellite data communication unit. The apparatus 400 further comprises a power source, such as a battery 450 or a connection to external power.

In a further embodiment the apparatus 400 comprises a user interface unit 430 comprising for example a display or a touch display for showing for example the image seen by the camera 20.

In a still further embodiment, the apparatus 400 comprises, or is comprised in, a personal electronic device such as a flashlight, a wristwatch, a smart watch, an activity bracelet, a mobile phone, a smartphone, a tablet or a computer and configured to co-operate with the system 100 for providing stealthy illumination. In an embodiment, the apparatus 400 is comprised in a larger apparatus, such as a vehicle or a drone.

Some use cases relating to given embodiments of the system for providing stealthy vision according to embodiments of the invention, are presented in the following. In a first use case, the system 100 for providing stealthy illumination is used to provide illumination in a situation in which the light should not be visible to others and/or to naked eye, for example in military operation or in nature observations.

In a second use case, the system 100 for providing stealthy illumination is used to provide illumination less disturbing to others, for example as an additional light for vehicle arrangements such as collision warning arrangement.

In a third use case, the system 100 for providing stealthy illumination is used for lighting while avoiding light pollution, for example security lighting for security cameras.

In a fourth use case, the system 100 for providing stealthy illumination is used to create visual information visible only up to a certain distance and with certain equipment, for example guide texts or light signals, or light arrangements that have deliberately different appearance from different viewing distances.

Without in any way limiting the scope, interpretation, or application of the claims appearing below, a technical effect of one or more of the example embodiments disclosed herein is the provision of lighting that does not reach unwanted parties or distances. Another technical effect of one or more of the example embodiments disclosed herein is a simplified system for providing illumination with a limited range as the inventors have found that the predetermined wavelengths hereinbefore described provide for a robust and cost-effective arrangement without diminishing the functionality of the illumination. Another technical effect of one or more of the example embodiments disclosed herein is the provision of controlling the visibility of illumination.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

The invention claimed is:

1. A system for providing stealthy vision, comprising:
a source element configured to provide electromagnetic radiation at a predetermined wavelength in order to illuminate a target, wherein the electromagnetic radiation is provided without controlling at least one of temperature or electrical current; and
a camera configured to image the target to be illuminated at the predetermined wavelength; wherein,
the source element is configured to provide electromagnetic radiation comprising shortwave infrared light; and
the predetermined wavelength comprises a wavelength in a region of the near infrared spectrum wherein the absorption features of an atom or a molecule present in a medium through which the electromagnetic radiation propagates form a continuum, that is a wavelength region wherein two or more narrow absorption lines are proximate to each other that they form a single absorption area with a width greater than that of a single absorption line so that the range of the electromagnetic radiation in the medium is limited for all wavelengths within the continuum; and wherein the region corresponds to a wavelength range centered at 1382.8 nm, 1388.1 nm or 1392.4 nm.

2. The system for providing stealthy vision of claim 1, wherein the wavelength region has a width of more than 0.2 nm.

3. The system for providing stealthy vision according to claim 1, wherein the wavelength region has a width of more than 0.5 nm.

4. The system for providing stealthy vision according to claim 1, wherein the source element comprises a laser source configured to provide the predetermined wavelength.

5. The system for providing stealthy vision according to claim 1, wherein the source element comprises a broadband source of electromagnetic radiation.

6. The system for providing stealthy vision according to claim 1, wherein the source element comprises a filter element configured to filter the electromagnetic radiation to the predetermined wavelength.

7. The system for providing stealthy vision according to claim 1, wherein the camera comprises a short wave infrared, SWIR, camera.

8. The system for providing stealthy vision according to claim 1, wherein the atom or molecule present in the medium through which the electromagnetic radiation propagates comprises H2O.

9. The system for providing stealthy vision according to claim 1, wherein the source element is adjustable for choosing a predetermined wavelength.

10. A method for providing stealthy vision, comprising:
illuminating a target with electromagnetic radiation comprising shortwave infrared light at a predetermined wavelength from a source element, wherein the source element provides the electromagnetic radiation without controlling at least one of temperature or electrical current; and
imaging the illuminated target with camera configured to image the target to be illuminated at the predetermined wavelength; wherein
the predetermined wavelength comprises a wavelength in a region of the near infrared spectrum wherein the absorption features of an atom or a molecule present in a medium through which the electromagnetic radiation propagates form a, that is a wavelength region wherein two or more narrow absorption lines are proximate to each other that they form a single absorption area with a width greater than that of a single absorption line so that the range of the electromagnetic radiation in the medium is limited for all wavelengths within the continuum; and wherein
the region corresponds to a wavelength range centered at 1382.8 nm, 1388.1 nm or 1392.4 nm.

11. The method for providing stealthy vision according to claim 10, wherein the wavelength region has a width of more than 0.2 nm.

12. The method for providing stealthy vision according to claim 10, wherein the wavelength region has a width of more than 0.5 nm.

13. The method for providing stealthy vision according to claim 10, further comprising adjusting the source element in order to choose a predetermined wavelength from several predetermined wavelengths.

14. An apparatus, comprising:
a system for providing stealthy vision, comprising:
a source element configured to provide electromagnetic radiation at a predetermined wavelength in order to illuminate a target, wherein the source element provides the electromagnetic radiation without controlling at least one of temperature or electrical current;

a camera configured to image the target to be illuminated at the predetermined wavelength; wherein the source element is configured to provide electromagnetic radiation comprising shortwave infrared light; and the predetermined wavelength comprises a wavelength in a region of the near infrared spectrum wherein the absorption features of an atom or a molecule present in a medium through which the electromagnetic radiation propagates form a continuum, that is a wavelength region wherein two or more narrow absorption lines are proximate to each other that they form a single absorption area with a width greater than that of a single absorption line so that the range of the electromagnetic radiation in the medium is limited for all wavelengths within the continuum; and wherein the region corresponds to a wavelength range centered at 1382.8 nm, 1388.1 nm or 1392.4 nm; and a processor configured to cause the apparatus to carry out the method of claim 10.

15. The apparatus of claim 14, wherein the apparatus comprises a handheld electronic device.

* * * * *